United States Patent
Chang et al.

(10) Patent No.: US 11,586,925 B2
(45) Date of Patent: Feb. 21, 2023

(54) NEURAL NETWORK RECOGNTION AND TRAINING METHOD AND APPARATUS

(71) Applicant: Samsung Electronics Co., Ltd., Suwon-si (KR)

(72) Inventors: Hyun Sung Chang, Seoul (KR); Donghoon Sagong, Suwon-si (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1262 days.

(21) Appl. No.: 15/946,800

(22) Filed: Apr. 6, 2018

(65) Prior Publication Data

US 2019/0102678 A1 Apr. 4, 2019

(30) Foreign Application Priority Data

Sep. 29, 2017 (KR) .......................... 10-2017-0127709

(51) Int. Cl.
*G06V 10/44* (2022.01)
*G06N 3/084* (2023.01)
(Continued)

(52) U.S. Cl.
CPC ............. *G06N 3/084* (2013.01); *G06F 17/18* (2013.01); *G06K 9/627* (2013.01); *G06K 9/6277* (2013.01);
(Continued)

(58) Field of Classification Search
CPC .... G06N 3/084; G06N 3/0445; G06N 3/0454; G06N 3/0472; G06N 3/02;
(Continued)

(56) References Cited

U.S. PATENT DOCUMENTS

| | | | |
|---|---|---|---|
| 9,665,823 B2 | 5/2017 | Saon et al. | |
| 2016/0092766 A1* | 3/2016 | Sainath | G10L 25/30 706/20 |
| 2018/0336439 A1* | 11/2018 | Kliger | G06N 3/088 |

FOREIGN PATENT DOCUMENTS

| | | | | |
|---|---|---|---|---|
| CN | 104346440 A | | 2/2015 | |
| CN | 106548210 A | * | 3/2017 | ........... G06K 9/6219 |

(Continued)

OTHER PUBLICATIONS

Gutmann, Michael, et al. "Noise-contrastive estimation: A new estimation principle for unnormalized statistical models." *Proceedings of the Thirteenth International Conference on Artificial Intelligence and Statistics*, 2010 (pp. 297-304).

(Continued)

*Primary Examiner* — Jose L Couso
(74) *Attorney, Agent, or Firm* — NSIP Law

(57) ABSTRACT

Disclosed is a recognition and training method and apparatus. The apparatus may include a processor configured to input data to a neural network, determine corresponding to a multiclass output a mapping function of a first class and a mapping function of a second class, acquire a result of a loss function including a first probability component that changes correspondingly to a function value of the mapping function of the first class and a second probability component that changes contrastingly to a function value of the mapping function of the second class, determine a gradient of loss corresponding to the input data based on the result of the loss function, update a parameter of the neural network based on the determined gradient of loss for generating a trained neural network based on the updated parameter. The apparatus may input other data to the trained neural network, and indicate a recognition result.

35 Claims, 9 Drawing Sheets

(51) Int. Cl.
    *G06N 3/04*    (2023.01)
    *G06F 17/18*    (2006.01)
    *G06K 9/62*    (2022.01)

(52) U.S. Cl.
    CPC ......... *G06K 9/6298* (2013.01); *G06N 3/0445*
        (2013.01); *G06N 3/0454* (2013.01); *G06V*
        *10/454* (2022.01)

(58) Field of Classification Search
    CPC .... G06N 3/08–088; G06N 7/00; G06N 20/00;
        G06F 17/18; G06K 9/627; G06K 9/6277;
        G06K 9/6298; G06K 9/6267; G06K
        9/4628; G06K 9/6232; G06K 9/00; G06K
        7/1482; G06V 10/454; G06V 10/82;
        G06V 10/764; G06V 30/19173; G06V
        10/44; G06V 30/18057; G06T 3/4046;
        G06T 9/002; G06T 2207/20084
    See application file for complete search history.

(56) References Cited

FOREIGN PATENT DOCUMENTS

| CN | 106874914 | A | * | 6/2017 | ............ B25J 9/1664 |
| CN | 107423306 | A | * | 12/2017 | ......... G06F 16/5838 |
| CN | 107944410 | A | * | 4/2018 | ......... G06K 9/00268 |
| CN | 108205687 | A | * | 6/2018 | ............ G06K 9/627 |
| CN | 108656992 | A | * | 10/2018 | .............. B60L 58/10 |
| CN | 108669993 | A | * | 10/2018 | ......... A47G 29/1201 |
| CN | 110097047 | A | * | 8/2019 | ......... G06K 9/00825 |
| CN | 110188781 | A | * | 8/2019 | ........... G06K 9/6256 |
| CN | 110197100 | A | * | 9/2019 | ......... G06K 9/00624 |
| CN | 110210618 | A | * | 9/2019 | .............. G06N 3/082 |
| JP | 3618007 | B2 | | 2/2005 | |
| KR | 1999-0082557 | A | | 11/1999 | |
| KR | 10-2016-0037022 | A | | 4/2016 | |
| KR | 10-2017-0053525 | A | | 5/2017 | |
| KR | 10-2017-0070715 | A | | 6/2017 | |
| TW | 201800983 | A | * | 1/2018 | ......... G01N 21/9501 |
| WO | WO2017073000 | A | * | 4/2017 | ............... G06N 3/08 |

OTHER PUBLICATIONS

Goodfellow, Ian, et al. "Generative Adversarial Nets." *Advances in neural information processing systems*. 2014 (9 pages in English).

Jaderberg, Max et al., "Spatial Transformer Networks." Advances in neural information processing systems. 2015 (9 pages in English).

Frazao, Xavier, et al. "Weighted Convolutional Neural Network Ensemble." Iberoamerican Congress on Pattern Recognition. Springer, Cham, 2014.

Korean Office Action dated Nov. 21, 2022, in counterpart Korean Patent Application No. 10-2017-0127709 (4 pages in English, 7 pages in Korean).

* cited by examiner

FIG. 1
100
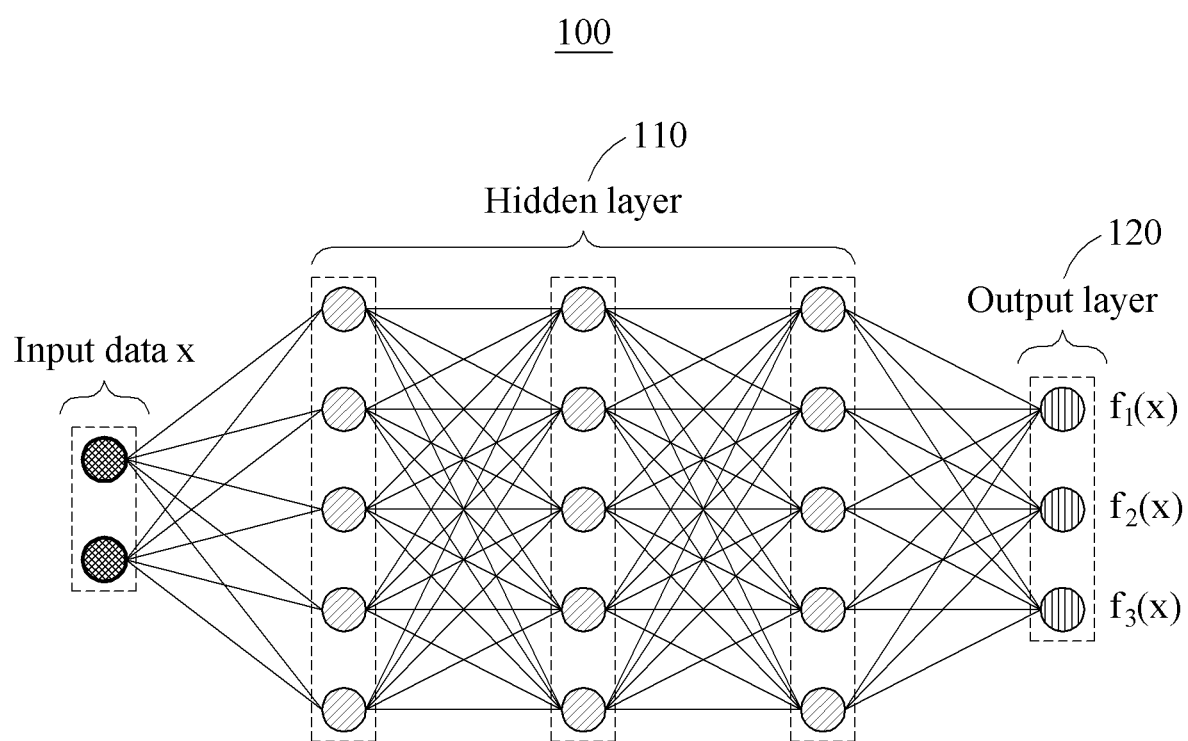
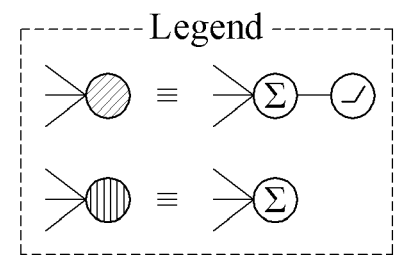

NEURAL NETWORK RECOGNTION AND TRAINING METHOD AND APPARATUS

CROSS-REFERENCE TO RELATED APPLICATIONS

This application claims the benefit under 35 USC § 119(a) of Korean Patent Application No. 10-2017-0127709 filed on Sep. 29, 2017 in the Korean Intellectual Property Office, the entire disclosure of which is incorporated herein by reference for all purposes.

BACKGROUND

1. Field

The following description relates to a neural network recognition and training method and apparatus.

2. Description of Related Art

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented training method includes inputting input data to a neural network, determining respective mapping functions corresponding to a multiclass output of the neural network in association with the input data, including determining a mapping function of a first class and a mapping function of a second class, acquiring a result of a loss function including a first probability component that changes correspondingly to a function value of the mapping function of the first class and a second probability component that changes contrastingly to a function value of the mapping function of the second class, determining a gradient of loss corresponding to the input data based on the result of the loss function, and updating a parameter of the neural network based on the determined gradient of loss for generating a trained neural network based on the updated parameter.

The first probability component may increase with respect to increases in the function value of the mapping function of the first class and the second probability component may decrease with respect to increases in the function value of the mapping function of the second class.

The first probability component may be based on a probability function associated with the mapping function of the first class and the second probability component may be based on an inverse probability function associated with the mapping function of the second class.

In response to the parameter of the neural network being updated iteratively, a monotonically increasing relationship may be established between the mapping function of the first class and a conditional probability of input data of the first class being recognized as the first class.

The loss function may corresponds to an equation as follows:

$$L_{2a} = -\sum_{i=1}^{c}\sum_{x \in X_i}\left(\log \sigma(f_i(x)) + \sum_{\substack{j=1 \\ j \neq i}}^{c} \log(1 - \sigma(f_j(x)))\right),$$

where $L_{2a}$ denotes the loss function, i and j denote respective classes, c denotes of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

The method may further include acquiring another loss function, wherein the other loss function corresponds to another equation as follows:

$$L_1 = -\sum_{i=1}^{c}\sum_{x \in X_i} \log \frac{e^{f_i(x)}}{\sum_{j=1}^{c} e^{f_j(x)}},$$

where the method may still further include determining another gradient of loss corresponding to the input data based on the other loss function, and updating another parameter of the neural network based on the determined other gradient of loss.

The loss function may corresponds to an equation as follows:

$$L_{2b} = -\sum_{i=1}^{c}\sum_{x \in X_i}\left(\log \sigma(f_i(x)) + \sum_{j=1}^{c} \log(1 - \sigma(f_j(x)))\right),$$

where $L_{2b}$ denotes the loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

The method may further include acquiring another loss function, wherein the other loss function corresponds to another equation as follows:

$$L_1 = -\sum_{i=1}^{c}\sum_{x \in X_i} \log \frac{e^{f_i(x)}}{\sum_{j=1}^{c} e^{f_j(x)}},$$

where the method may still further include determining another gradient of loss corresponding to the input data based on the other loss function, and updating another parameter of the neural network based on the determined other gradient of loss.

The loss function may correspond a contrastive loss function, and the method may further include determining another gradient of loss corresponding to the input data based on a cross-entropy loss function, and updating another parameter of the neural network based on the determined other gradient of loss for the generating of the trained neural network.

The updating may include adjusting the parameter of the neural network in a direction opposite to a direction of the determined gradient of loss.

In one general aspect, provided is a non-transitory computer-readable storage medium storing instructions that, when executed by a processor, cause the processor to perform one or more, any combination, or operations described herein.

In one general aspect, a processor implemented recognition method includes inputting input data respectively to each of a first neural network portion of a neural network trained using a first loss function and a second neural network portion of the neural network trained using a second loss function, respectively normalizing each of an output of the first neural network portion and an output of the second neural network portion based on a reference level, obtaining a weighted average of the normalized output of the first neural network portion and the normalized output of the second neural network portion, and indicating a recognition result of the neural network based on the obtained weighted average.

The reference level may correspond to a conditional probability of data of a first class being recognized by the neural network as the first class.

The first loss function, as a contrastive loss function, may include a first probability component that changes correspondingly to a function value of a mapping function of a first class and a second probability component that changes contrastingly to a function value of a mapping function of a second class.

The second loss function may correspond to a cross-entropy loss function.

The first loss function may correspond to an equation as follows:

$$L_{2a} = -\sum_{i=1}^{c}\sum_{x \in X_i}\left(\log \sigma(f_i(x)) + \sum_{\substack{j=1 \\ j \neq i}}^{c} \log(1 - \sigma(f_j(x)))\right),$$

where $L_{2a}$ denotes the first loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

The second loss function may correspond to an equation as follows:

$$L_{2b} = -\sum_{i=1}^{c}\sum_{x \in X_i}\left(\log \sigma(f_i(x)) + \sum_{j=1}^{c} \log(1 - \sigma(f_j(x)))\right).$$

The normalizing may include normalizing the output of the first neural network using an equation as follows:

$$\sigma(f_i(x)).$$

The first loss function may correspond to an equation as follows:

$$L_{2b} = -\sum_{i=1}^{c}\sum_{x \in X_i}\left(\log \sigma(f_i(x)) + \sum_{j=1}^{c} \log(1 - \sigma(f_j(x)))\right),$$

where $L_{2b}$ denotes the first loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

The normalizing may include normalizing the output of the first neural network portion using an equation as follows:

$$e^{f_i(x)}.$$

In one general aspect, a neural network apparatus may include a processor configured to input input data to a neural network, determine respective mapping functions corresponding to a multiclass output of the neural network in association with the input data, including determining a mapping function of a first class and a mapping function of a second class, acquire a result of a loss function including a first probability component that changes correspondingly to a function value of the mapping function of the first class and a second probability component that changes contrastingly to a function value of the mapping function of the second class, determine a gradient of loss corresponding to the input data based on the result of the loss function, and update a parameter of the neural network based on the determined gradient of loss for generating a trained neural network based on the updated parameter.

The apparatus may include a memory including instructions, wherein, in response to the instructions being executed by the processor, the processor is controlled to perform the determining of the respective mapping functions, the acquiring of the result of the loss function, the determining of the gradient of loss, and the updating of the parameter of the neural network for the generating of the trained neural network based on the updated parameter.

The first probability component may increase with respect to the function value of the mapping function of the first class and the second probability component may decrease with respect to increases in the function value of the mapping function of the second class.

The first probability component may be based on a probability function associated with the mapping function of the first class and the second probability component may be based on an inverse probability function associated with the mapping function of the second class.

The loss function may correspond to an equation as follows:

$$L_{2a} = -\sum_{i=1}^{c} \sum_{x \in X_i} \left( \log \sigma(f_i(x)) + \sum_{\substack{j=1 \\ j \neq i}}^{c} \log (1 - \sigma(f_j(x))) \right),$$

where $L_{2a}$ denotes the loss function, i and j denote respective classes, c denotes a number of classes, x denotes input data, $X_i$ denotes input data of a class i, σ denotes a sigmoid function, and $f_i(x)$ denotes a mapping function of the class i, and $f_j(x)$ denotes a mapping function of a class j.

The loss function may correspond to an equation as follows:

$$L_{2b} = -\sum_{i=1}^{c} \frac{\sum}{\ldots} \left( \log \sigma(f_i(x)) + \sum_{j=1}^{c} \log (1 - \sigma(f_j(x))) \right),$$

where $L_{2b}$ denotes the loss function, i and j denote respective classes, c denotes a number of classes, x denotes input data, $X_i$ denotes input data of a class i, σ denotes a sigmoid function, $f_i(x)$ denotes a mapping function of the class i, and $f_j(x)$ denotes a mapping function of a class j.

The loss function may correspond a contrastive loss function, and the processor may be further configured to determine another gradient of loss corresponding to the input data based on a cross-entropy loss function, and update another parameter of the neural network based on the determined other gradient of loss for the generating of the trained neural network.

The input data may be training data and the trained neural network may be a first neural network portion of a recognition neural network, and the processor may be further configured, for performing recognition of non-training input data, to input the non-training input data to each of the first neural network portion trained using the loss function, and a second neural network portion trained using a different loss function, normalize each of an output of the first neural network portion and an output of the second neural network portion based on a reference level, obtain a weighted average of the normalized output of the first neural network portion and the normalized output of the second neural network portion, and indicate a recognition result of the recognition neural network based on the obtained weighted average.

Other features and aspects will be apparent from the following detailed description, the drawings, and the claims.

BRIEF DESCRIPTION OF THE DRAWINGS

FIG. 1 illustrates an example neural network structure, in accordance with one or more embodiments.

Figure 2:
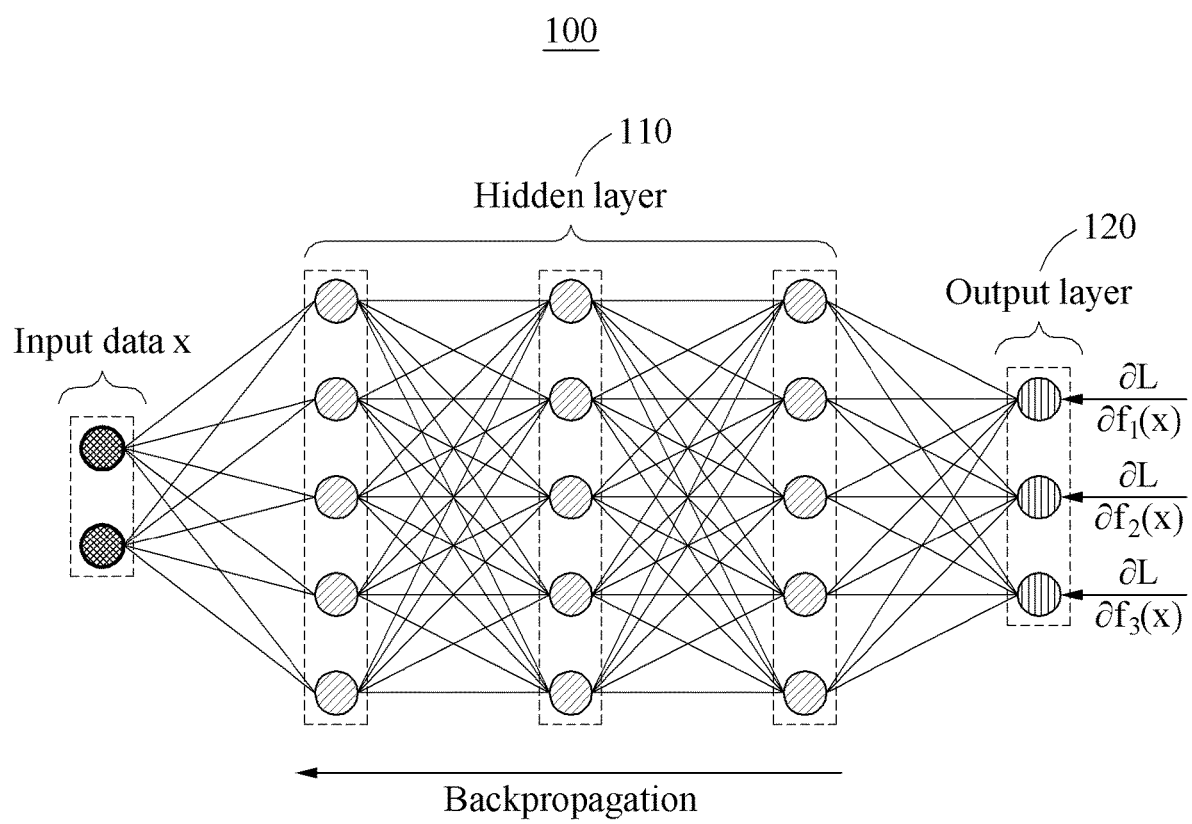
FIG. 2 illustrates an example neural network training process, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 illustrates an example of an example neural network structure, in accordance with one or more embodiments.

A neural network 100 may be a deep neural network (DNN), as a non-limiting example. In such an example, the DNN may be one or more of a fully connected network, a deep convolutional network, and/or a recurrent neural network, or may include different or overlapping neural network portions respectively with such full, convolutional, or recurrent connections. The neural network 100 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a big data set, as non-limiting examples. The deep learning may be implemented by mapping of input data and the output data through supervised or unsupervised learning or training, such that when trained the resultant machine learning model, engine, or example NN may intuitively map further input data to output data with a desired accuracy or reliability. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The example neural network 100 includes an input layer, hidden layers 110, and an output layer 120. The input layer and the output layer 120 may respectively include one or more nodes and the hidden layers 110 may each include a plurality of nodes. The nodes may also be referred to as artificial neurons though such reference is not intended to impart any relatedness with respect to how the neural network architecture computationally maps or thereby intuitively recognizes information and how a human's neurons operate, i.e., the term artificial neuron is merely a term of art referring to the hardware implemented nodes of a neural network.

Although FIG. 1 illustrates hidden layers 110, e.g., illustrating three hidden layers, the hidden layers 110 may include any number of one or more such hidden layers in various ways. Also, although FIG. 1 illustrates input data x of the input layer is next input to a first hidden layer of the hidden layers 110, the neural network 100 may also include different input layers to receive various input data. Also, in differing examples, data may input to the input layer in various forms, and in various dimensional forms, input to respective nodes of the input layer of the neural network 100. In the neural network 100, nodes of layers other than the output layer 120 are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. The links are also referred to as connections or connection weights. Such links may also be casually referred to as synapses or synaptic weights though such references are not intended to impart any relatedness with respect to how the neural network architecture computationally maps or thereby intuitively recognizes information and how a human's synapses operate, i.e., the term synapse or synaptic weight is merely a term of art referring to the hardware implemented connections or the corresponding 'connection weights' provided by those connections of a neural network. During training and implementation such connections and connection weights may be selectively implemented, removed, and varied to generate or obtain a resultant neural network that is thereby trained and that may be correspondingly implemented for the trained objective, such as for any of the above example recognition objectives.

The architecture, selective connections between neighboring nodes, and corresponding connection weights may be varied during training. The connection weights of the neuro network may be referred to as parameters of the neural network. For example, in a non-limiting supervised training example, the neural network may be trained based on labeled input image information or desired corresponding output images classifications and through backpropagation, as only an example. In the training, connection weightings between nodes of different hidden layers may be recursively adjusted until the corresponding neural network model is trained with a desired accuracy rate or below a maximum error rate, for example. The respectively trained neuro network may be stored in a memory of the training or recognition apparatus. For example, the trained neural network may be stored in trained vectors, matrix or matrices, or other format, where elements of the matrix represent or suggest the corresponding trained weighted connections (parameters) of the corresponding neural network structure. The stored trained neural network may further include hyper-parameter information, which may define the specific structure or architecture of the corresponding neural network for which the example stored trained parameters correspond to. The hyper-parameters may define how many hidden layers, the function of the layers, such as whether they are convolutional layers, as only example, such as how many and respective structures there are of such convolutional, de-convolutional, sampling, recurrent, and/or fully connected hidden layers of the neural network structure. The hyper-parameters may further include information of the configuration and values of any bias and/or contextual nodes in the neural network in differing examples, corresponding activation functions of the nodes, types of nodes, such as long short-term memory nodes in some examples, and define any or any further recurrent structures of the neural network, which may vary in differing embodiments. In the above example when there are multiple input layers, the hyper-parameters may for example also describe the architecture of the neural network for where within the neural network information acted on by a portion of the neural network subsequent to a first input layer is merged or considered with neural network information acted on by another portion of the neural network subsequent to a second input layer, or further where such portion and other portion of the neural network are divergent portions after a single input layer whose respective information is similarly subsequently merged. Similarly, in examples with separate output layers, the hyper-parameters may for example also describe the architecture of the neural network for where within the neural network neural network information acted on by an earlier portion of the neural network diverges or is separately considered within the neural network by separate, e.g., independent or dependent, portions of the neural network for ultimate respective consideration and provision to the separate output layers or separate pre-output layers that are then collectively acted on by a single output layer. Here, the example neural network information within the neural network may be information resident at, or represented by, respective layers of the neural network, and/or respective information resident at, or represented by, respective connections within the neural network. In some examples, such as where a hidden layer is a convolutional layer, the layer may output or generate one or more extracted feature information of information provided to the convolutional layer and dependent on the respectively applied kernels of the convolutional layer. In this example, the input of the convolutional layer may be two, three, or more dimensional information, such as a three dimensional volume and the output of the convolutional layer may also be multi-dimensional information dependent on the set convolutional parameters, kernels, and architecture of the convolutional layer. The aforementioned input to the neural network 100, as well as the example input data x of the input layer, may similarly be singular or multi-dimensional information, such as in the form of pixels, time captured data, volume data, feature information, feature vectors, or feature maps, as non-limiting examples. Thus, the input data may be representative of image information, audio information, or other information. In an example where the neural network 100 is implemented with battery state monitoring for example, the input information may alternatively be various battery state information, e.g., voltage, current, temperature, etc., such as at different points in time or over periods of time.

Each of the nodes of the hidden layers 110 may produce or generate an output based on the each of the nodes implementing a corresponding activation function, e.g., associated with one or more connection weighted inputs from outputs of nodes of a previous layer. Here, though the connection weighted inputs will be discussed herein as being weighted inputs provided by a connection from a node of a previous layer, it is noted that examples are not limited thereto. For example, depending on the architecture of the node and/or the layer or neural network there may be recurrent connections where an output of a current node is fed back to the same node at a subsequent time, or there may be other memory, bias, or contextual connections that may or may not be weighted and may be based on, or independent from, the previous layer or may be connections from other subsequent layers, other neural network portions or neural networks, or one or more further previous layers. In an example, connection weighted input is obtained by multiplying inputs of the nodes included in the previous layer by the corresponding connection weight, i.e., implementing the connection weight for the corresponding connection. As noted above, the connection weight may also be referred to as a parameter of the neural network 100, and connection weights of a layer or between layers, or of portions or of the whole, of the neural network 100 may be referred to as parameters of the neural network 100, as non-limiting examples. An activation function may be any of, for example, a sigmoid, a hyperbolic tangent (tan h), and a rectified linear unit (ReLU), as non-limiting examples. Such activation functions are used to form or impart a nonlinearity of/to the neural network 100. There may be different activation functions used in different layers, such as where the activation functions may be varied during optimization, resulting in different activation functions for different layers. As a non-limiting example, the same activation function may be respectively implemented by all nodes of a particular layer, or for all nodes of the hidden layers, as non-limiting examples. The weighted inputs of the nodes included in the final hidden layer are thus output to, or input to, each of the nodes of the output layer 120. As another example, the nodes (i.e., output nodes) of the output layer 120 may also implement respective activation functions, such as a SoftMax max function, noting that alternative examples are available and that depending on the trained objective of the output nodes of the neural network 100 the nodes of the output layer 120 may have different activation functions, e.g., to output different types of classification or pattern recognition information.

For example, referring to FIG. 1, when the input data x is present or forwarded by the input layer, the respective output nodes of the neural network 100 calculate function values $f_1(x), \ldots, f_c(x)$ each corresponding to a particular class of the plural number of classes c to be classified and/or recognized in the output layer 120 through the hidden layers 110, and thereby classify and/or recognize the input data x as the class corresponding to the greatest value among the function values $f_1(x), \ldots, f_c(x)$. In this manner, the neural network 100 classifies or recognizes the input data x. Hereinafter, such a classification and/or recognition process of the neural network 100 will be described through a recognition process for brevity of description. Though the recognition process will be used for explanation purposes, the examples also include implementing the following training operations and methods in classification process examples.

As an example, when a width (e.g., number of nodes and/or connections) and a depth (e.g., number of layers) of the neural network 100 are deemed sufficient with deemed sufficient trained parameters through training discussed herein, the neural network 100 may have a capacity of implementing a predetermined function, e.g., with a predetermined acceptable accuracy and/or error rates. For example, when the neural network 100 learns a sufficient amount of training data through an appropriate training process and meets such predetermined accuracy or error constraints or thresholds, an optimal recognition performance may be achieved. For example, a function to be implemented by the neural network 100 to achieve the optimal recognition performance may be defined as a mapping function $f_i(x)$, i being a class corresponding to a target of recognition. When a plurality of targets of recognition is present, the plurality of targets of recognition is referred to as a multiclass. In identity recognition, for example, the targets of recognition may correspond to the different identities that are available that the input could be classified as corresponding to. Alternatively, in speech recognition for example, the respective targets could correspond to the different recognizable sound or word portions, recognizable words, or phrases or sentences, as non-limiting examples. For example, a particular output node may output a probabilistic indication of whether the input data is classifiable as the corresponding target the output node is trained to recognize/classify for.

When the mapping function $f_i(x)$ is implemented, the mapping function $f_i(x)$ may have a monotonically increasing relationship with a corresponding conditional probability $Pr(i|x)$. The conditional probability $Pr(i|x)$ represents a probability of the input data x being recognized as a class i. The mapping function $f_i(x)$ represents a function value of the class i associated with the input data x. When the mapping function $f_i(x)$ is implemented, and when the monotonically increasing relationship is established between the mapping function $f_i(x)$ and the conditional probability $Pr(i|x)$, selecting the class corresponding to the greatest function value of the mapping function $f_i(x)$ is equal to recognizing the input data as the class which maximizes the conditional probability Pr(i|x). One or more examples herein may provide training methods for the neural network 100 to establish the monotonically increasing relationship between the mapping function $f_i(x)$ and the conditional probability Pr(i|x), for example.

FIG. 2 illustrates an example neural network training process, such as for the neural network 100, in accordance with one or more embodiments.

The neural network 100 is trained based on a loss function. For example, a pre-trained neural network may initially be generated by initializing parameters of the neural network 100, and then the parameters of the neural network 100 may repetitively adjusted based on respective loss function considerations until the neural network 100 is trained. The loss function represents a difference between a class of input data x and a class recognized using a mapping function $f_i(x)$ as an error. The neural network 100 is trained by minimizing the loss function. In a process of training, the input data x is also referred to as training data x. Also, training of the neural network 100 is also referred to as, for example, training of a parameter of the neural network 100, updating of the neural network 100, and updating of the parameter of the neural network 100, though examples also include such training and updating of multiple parameters until the neural network is fully trained to an acceptable form, as discussed above.

In a multiclass environment where the number of classes to be recognized exceeds two, the neural network 100 is trained by minimizing a loss function using the below Equation 1, for example.

$$L_1 = -\sum_{i=1}^{c} \sum_{x \in X_i} \log \frac{e^{f_i(x)}}{\sum_{j=1}^{c} e^{f_j(x)}} \quad \text{Equation 1}$$

In Equation 1, $L_1$ denotes a loss function, i and j each denote a class, c denotes the number of classes, x denotes input data, $X_i$ denotes input data of a class i, and $f_i(x)$ denotes a mapping function of the class i. Equation 1 may also correspond to a cross-entropy loss.

To train the neural network 100, while back-propagating a gradient of loss of a loss function corresponding to a function value as expressed by the below Equation 2, for example, a gradient of a loss function corresponding to a parameter $\Theta$ of the neural network 100 is sequentially calculated using the below Equation 3, for example, to minimize the loss function based on a gradient descent-based iterative algorithm. In this example, the parameter $\Theta$ is gradually updated according to the below Equation 4, for example.

$$\frac{\partial L}{\partial f_i(x)} \quad \text{Equation 2}$$

$$\frac{\partial L}{\partial \Theta} = \sum_i \frac{\partial f_i(x)}{\partial \Theta} \frac{\partial L}{\partial f_i(x)} \quad \text{Equation 3}$$

$$\Theta \leftarrow \Theta - \mu \frac{\partial L}{\partial \Theta} \quad \text{Equation 4}$$

In Equations 2 through 4, L denotes a loss function, i denotes a class, $f_i(x)$ denotes a mapping function of a class i, $\Theta$ denotes a parameter of the neural network 100, and $\mu$ denotes a learning rate.

The loss function may be used for establishing a monotonically increasing relationship between the mapping function $f_i(x)$ and a conditional probability Pr(i|x). The mapping function $f_i(x)$ may be implemented using the loss function that establishes the monotonically increasing relationship between the mapping function $f_i(x)$ and a conditional probability Pr(i|x). By minimizing the loss function, the neural network 100 may be considered optimized. As such examples of loss functions that may establish such monotonically increasing relationships between the mapping function $f_i(x)$ and the corresponding conditional probability Pr(i|x), respective example contrastive loss functions may be defined as shown in the below Equations 5 and 6, as examples.

$$L_{2a} = -\sum_{i=1}^{c} \sum_{x \in X_i} \left( \log \sigma(f_i(x)) + \sum_{\substack{j=1 \\ j \neq i}}^{c} \log(1 - \sigma(f_j(x))) \right) \quad \text{Equation 5}$$

$$L_{2b} = -\sum_{i=1}^{c} \sum_{x \in X_i} \left( \log \sigma(f_i(x)) + \sum_{j=1}^{c} \log(1 - \sigma(f_j(x))) \right) \quad \text{Equation 6}$$

In Equations 5 and 6, $L_{2a}$ and $L_{2b}$ each denote a contrastive loss function, i and j each denote a class, c denotes the number of classes, x denotes input data, $X_i$ denotes input data of a class i, $\sigma$ denotes a sigmoid function, and $f_i(x)$ denotes a mapping function of the class i. Thus, while the $L_1$ loss function may correspond to a cross-entropy loss function, as a non-limiting example, differently $L_{2a}$ and $L_{2b}$ loss functions may be considered as corresponding to contrastive loss functions.

The loss function $L_1$ of Equation 1 calculates a loss value by normalizing a function value based on an exponent, e.g., a logarithmic exponent. The loss function $L_{2a}$ of Equation 5 and the loss function $L_{2b}$ of Equation 6 calculate loss values based on a first probability component, for example, log $\sigma(f_i(x))$ that changes correspondingly to $f_i(x)$, and a second probability component, for example, $\log(1-\sigma(f_j(x)))$ that changes contrastively to a different $f_j(x)$. Here, $f_i(x)$ is also referred to as, for example, a mapping function of a first class and reflects a function value of the mapping function of the first class, while $f_j(x)$ is also referred to as, for example, a mapping function of a second class and reflects a function value of the mapping function of the second class. For example, the first class and the second class may be different classification or recognition classes.

The first probability component increases as $f_i(x)$ increases and the second probability component decreases as $f_j(x)$ increases. Also, the first probability component and the second probability component each include a sigmoid function $\sigma$. The first probability component is based on a probability function associated with $f_i(x)$ and the second probability component is based on an inverse probability function associated with the example $f_j(x)$. The inverse probability function may be a predetermined function having a monotonically decreasing relationship with the corresponding probability. Here, the probability function associated with $f_i(x)$ is, for example, $\sigma(f_i(x))$. Also, the inverse probability function associated with $f_j(x)$ is, for example, $1-\sigma(f_j(x))$. The probability function associated with $f_i(x)$ and the inverse probability function associated with $f_j(x)$ are expressed as logarithmic functions in the loss function $L_{2a}$ and the loss function $L_{2b}$.

A gradient of loss associated with the loss function $L_{2a}$ may be calculated using the below Equation 7, for example. A gradient of loss associated with the loss function $L_{2b}$ may be calculated using the below Equation 8, for example. The calculated gradients of loss correspond to an input of back-propagation as described with reference to FIG. 2.

$$\frac{\partial L_{2a}}{\partial f_i(x)} = \begin{cases} \sigma(f_i(x))-1, & i = \text{class}(x) \\ \sigma(f_i(x)), & i \neq \text{class}(x) \end{cases} \quad \text{Equation 7}$$

$$\frac{\partial L_{2b}}{\partial f_i(x)} = \begin{cases} 2\sigma(f_i(x))-1, & i = \text{class}(x) \\ \sigma(f_i(x)), & i \neq \text{class}(x) \end{cases} \quad \text{Equation 8}$$

In Equations 7 and 8, $L_{2a}$ and $L_{2b}$ each denote respective loss functions, i denotes a class, x denotes input data, σ denotes a sigmoid function, $f_i(x)$ denotes a mapping function of a class i, and class(x) denotes a class of input data x. A monotonically increasing relationship is established between $f_i(x)$ and $Pr(i|x)$ in response to a parameter Θ being iteratively updated based on the gradients of loss calculated using Equations 7 and 8. Training based on the use of the loss function $L_{2a}$ and the loss function $L_{2b}$ may show a lower error recognition rate for the ultimately trained neural network 100 in comparison to previous approaches or an example use of only the loss function $L_1$ to train the neural network.

Figure 3:
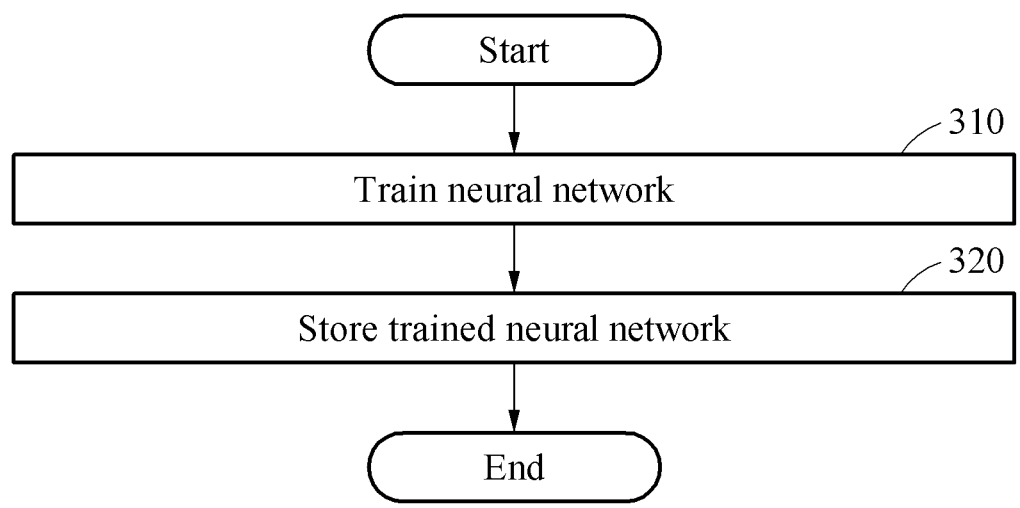
FIG. 3 illustrates an example neural network training method, in accordance with one or more embodiments.

FIG. 3 illustrates an example neural network training method, in accordance with one or more embodiments. Referring to FIG. 3, a training apparatus trains a neural network in operation 310 and stores the trained neural network in operation 320.

In operation 310, the training apparatus inputs input data to pre-trained, e.g., a neural network with initialized or pre-trained parameters, or an in-training neural network, e.g., in accordance with the repetitions of loss based parameter adjustments in the training operations described herein. In response to the input data being input to the neural network, the training apparatus determines a mapping function corresponding to a multiclass output of the neural network in association with the input data, acquires a loss function including a first probability component that changes correspondingly to a function value of a mapping function of a first class and a second probability component that changes contrastingly to a function value of a mapping function of a second class, determines a gradient of loss corresponding to the input data based on the loss function, and updates a parameter of the neural network based on the determined gradient of loss.

The loss function is, for example, one of the loss function $L_{2a}$ and the loss function $L_{2b}$ as described with reference to FIG. 2. In a process of updating the parameter of the neural network, the training apparatus adjusts the parameter toward the opposite direction of the determined gradient of loss. Also, acquiring of the function value of the mapping function by inputting the input data to the neural network may also be understood as acquiring the function value of the mapping function by calculating the mapping function based on the input data.

Figure 4:
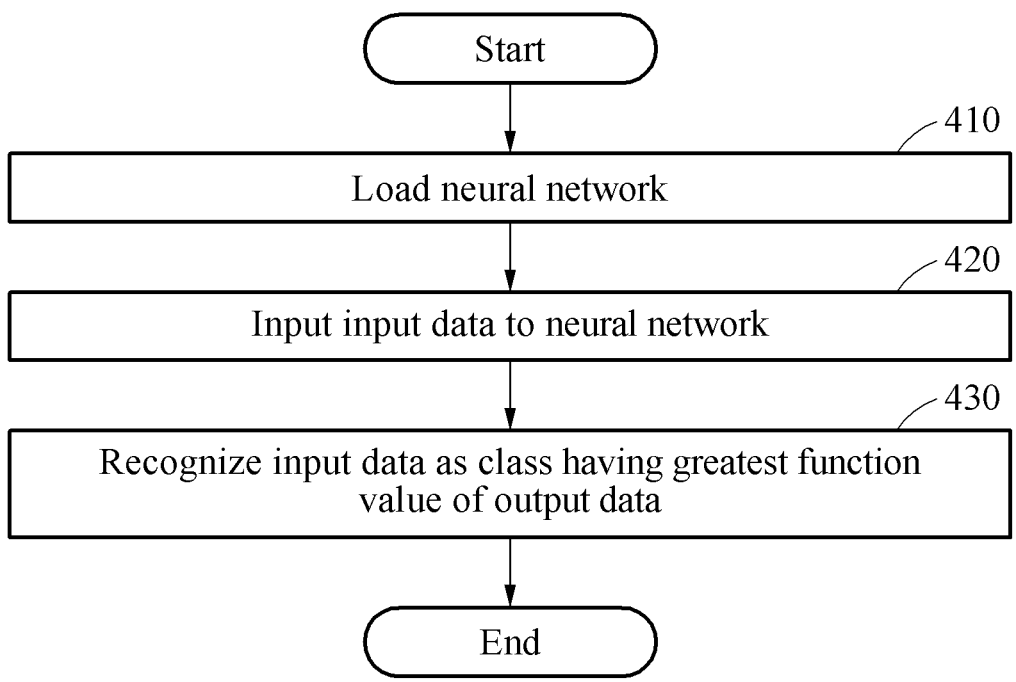
FIG. 4 illustrates an example neural network recognition method, in accordance with one or more embodiments.

FIG. 4 illustrates an example neural network recognition method, in accordance with one or more embodiments. Referring to FIG. 4, a recognition apparatus loads the trained neural network in operation 410, e.g., as trained herein with the aforementioned either or both example contrastive loss functions or either of the example contrastive loss functions in combination with another non-contrastive loss function, e.g., a cross-entropy loss function. The recognition apparatus then inputs input data to the neural network in operation 420, determines the greatest function value of the output data, and recognizes the input data as being of the class corresponding to determined greatest function value in operation 430. In operation 420, the recognition apparatus calculates a network function based on the input data and acquires a function value of a network function as the output data.

Figure 5:
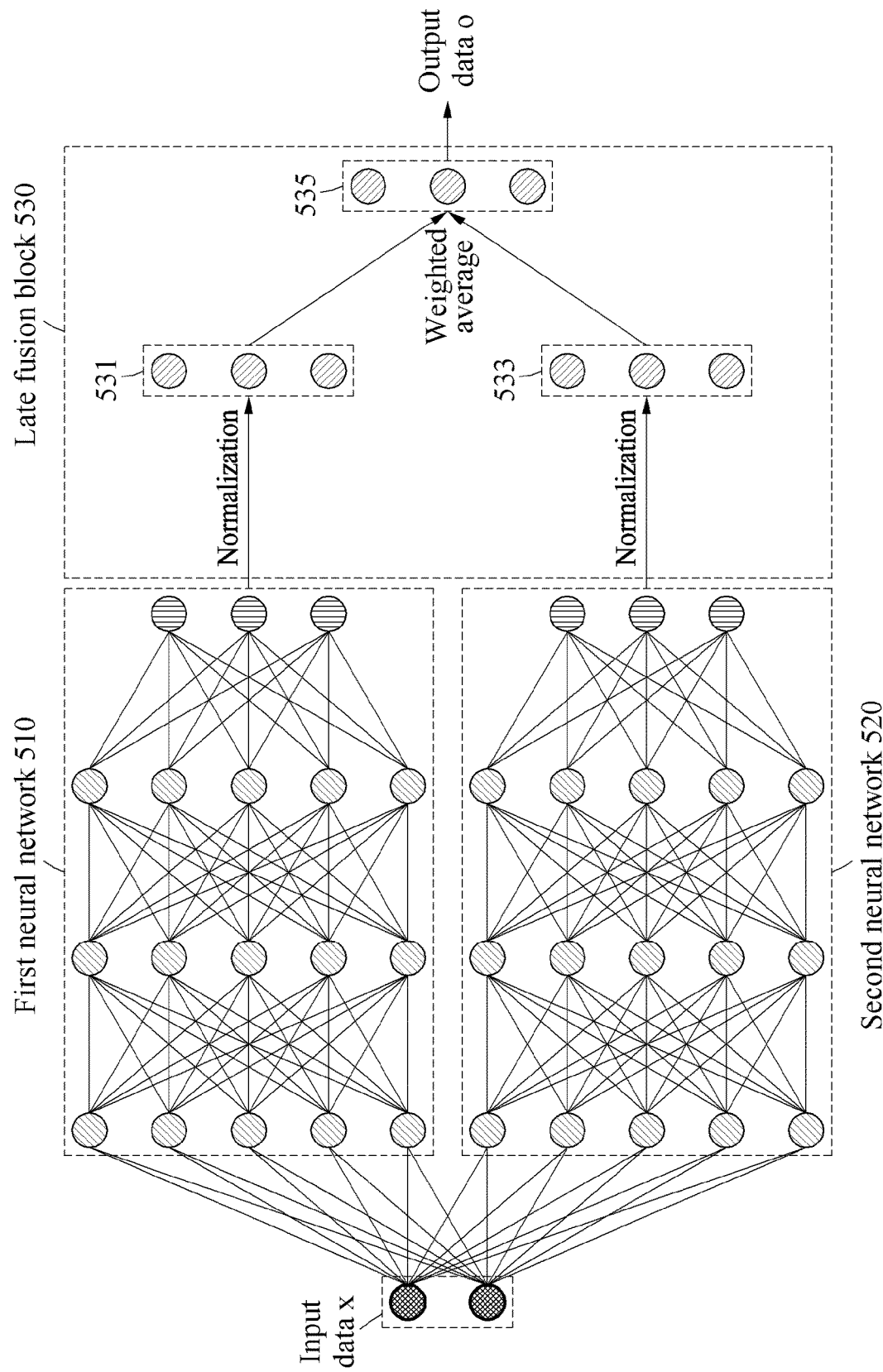
FIG. 5 illustrates an example multi-neural network structure, in accordance with one or more embodiments.

FIG. 5 illustrates an example multi-neural network structure, in accordance with one or more embodiments. Referring to FIG. 5, a multi-neural network includes a first neural network 510, a second neural network 520, and a late fusion block 530.

For example, the first neural network 510 is trained using a first loss function and the second neural network 520 is trained using a second loss function. In an example, the first neural network 510 and the second neural network 520 may be considered respective neural network portions of an overall neural network, e.g., the neural network represented by the combination of the input layer, first and second neural networks 510 and 520, and late fusion block 530. The first loss function and the second loss function may each be one of the aforementioned loss functions, for example, the loss functions $L_1$, $L_{2a}$, and $L_{2b}$. In an example, the first loss function may be of a first type of loss function and the second loss function may be of a second different type of loss function, e.g., loss functions based on different constraints, such as with the first loss function being a cross-entropy loss function type (e.g., $L_1$) and the second loss function(s) being a contrastive loss function type (e.g., $L_{2a}$ and/or $L_{2b}$). Also, while the first loss function type and the second loss function type may differ from each other, examples are not limited thereto. Thus, compared to previous training approaches that may rely only on a single loss function, such as an example sole use of a cross-entropy loss function, to perform training for various classification objectives, accuracies and performances of the corresponding implemented trained neural network(s) described herein, e.g., as represented by FIGS. 2 and 5, as non-limiting examples, may provide improvements over the previous approaches, as well provide greater user convenience through such greater accuracy and performance, thereby providing improvements in corresponding computer functionality. Thus, such improvements may be reflected when the example at least one contrastive loss function is used in the aforementioned example of FIG. 2, or when at least two loss functions are implemented in the training of the neural network of the example of FIG. 5, such as when at least both a cross-entropy loss function and contrastive loss function are respectively used to train the first and second neural networks 510, 520 of the overall neural network of FIG. 5, or when at least different contrastive loss functions are respectively used to train the first and second neural networks 510, 520 of the overall neural network of FIG. 5.

For example, as illustrated in FIG. 5 and using such respectively trained neural networks or neural network portions according to the training methods and operations described herein, input data x is input to each of the first neural network 510 and the second neural network 520, and an output of the first neural network 510 and an output of the second neural network 520 are acquired. Acquiring outputs of neural networks by inputting input data to the neural networks may be understood as acquiring the outputs of the neural networks by calculating network functions based on the input data.

The late fusion block 530 normalizes the output of the first neural network 510 and the output of the second neural network 520 based on the reference level and acquires a normalized output 531 of the first neural network 510 and a normalized output 533 of the second neural network 520. As only an example, such outputs may be in probabilistic forms, or other forms. The late fusion block 530 acquires weighted average data 535 by obtaining a weighted average of the normalized output 531 of the first neural network 510 and the normalized output 533 of the second neural network 520. The weighted average data 535 is output as output data o of the multi-neural network. For example, the weighted average data 535 may indicate a recognition result or classification result of the input data x. As the recognition result, the input data x may thereby be recognized or classified corresponding to whichever function value of the output data o has the greatest value. For example, if the output data o includes multiple output probabilities (e.g., one output probability for each output functions), each probability would indicate the likelihood of a corresponding class being the representative class for a particular input. If a first output probability corresponding to a class i is determined to have the greatest probability of all the output probabilities, then the input data may be recognized or classified as corresponding to class i, while if a second output probability corresponding to a class j is determined to have the greatest probability of all the output probabilities, then the input data may be recognized or classified as corresponding to class j. In an example, the reference level may correspond to a conditional probability $Pr(i|x)$ of the input data x of the class i being recognized as the class i.

An output of a neural network trained using the loss function $L_1$ may be normalized based on the reference level using the below Equation 9, for example. An output of a neural network trained using the loss function $L_{2a}$ may be normalized based on the reference level using the below Equation 10, for example. An output of a neural network trained using the loss function $L_{2b}$ may be normalized based on the reference level using the below Equation 11, for example.

$$\frac{e^{f_i(x)}}{\sum_{j=1}^{c} e^{f_j(x)}} \quad \text{Equation 9}$$

$$\sigma(f_i(x)) \quad \text{Equation 10}$$

$$e^{f_i(x)} \quad \text{Equation 11}$$

In Equations 9, 10, and 11, $f_i(x)$ denotes an output of the class i, x denotes input data, c denotes the number of classes, and σ denotes a sigmoid function.

The multi-neural network operates based on neural networks, for example, the first neural network 510 and the second neural network 520, trained using various loss functions and thus, provide a high recognition performance in classification and/or recognition operations, for example, in comparison to a single neural network trained using a single loss function, such as the aforementioned cross-entropy loss function.

Figure 6:
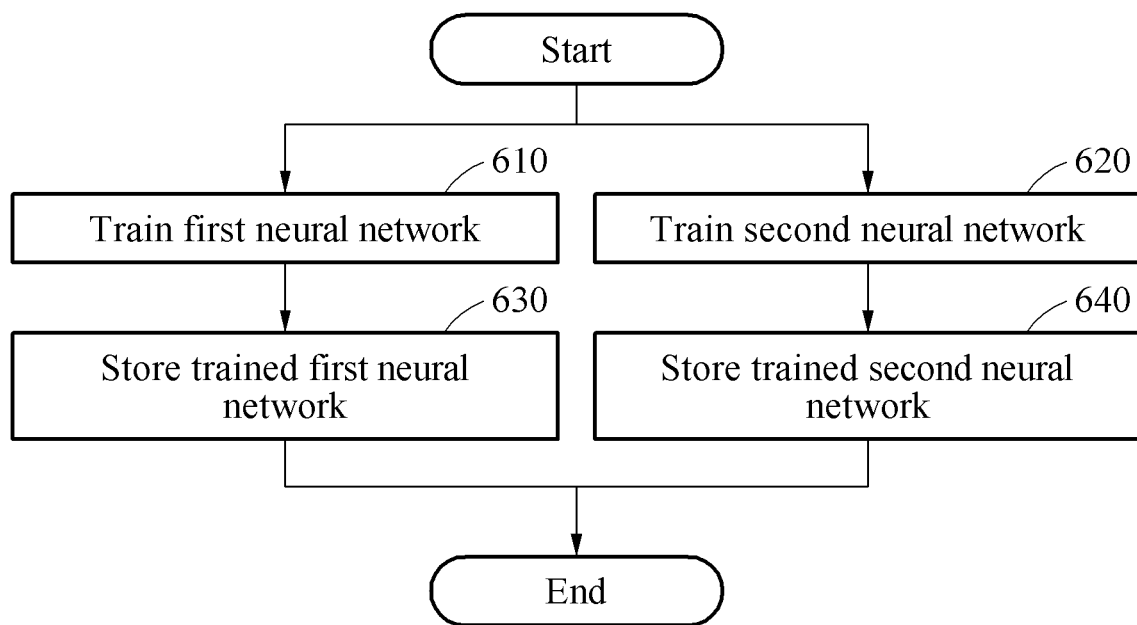
FIG. 6 illustrates an example multi-neural network training method, in accordance with one or more embodiments.

FIG. 6 illustrates an example multi-neural network training method, in accordance with one or more embodiments. Referring to FIG. 6, a training apparatus trains a first neural network in operation 610 and trains a second neural network in operation 620. The training apparatus trains the first neural network and the second neural network using different loss functions. The training apparatus stores the trained first neural network in operation 630 and stores the trained second neural network in operation 640. Though training and storing operations 610, 630 of FIG. 6 are discussed as being performed distinctly from training and storing operations 620, 640 of FIG. 6, it is noted that such operations may also be performed in parallel, e.g., as the same time.

Figure 7:
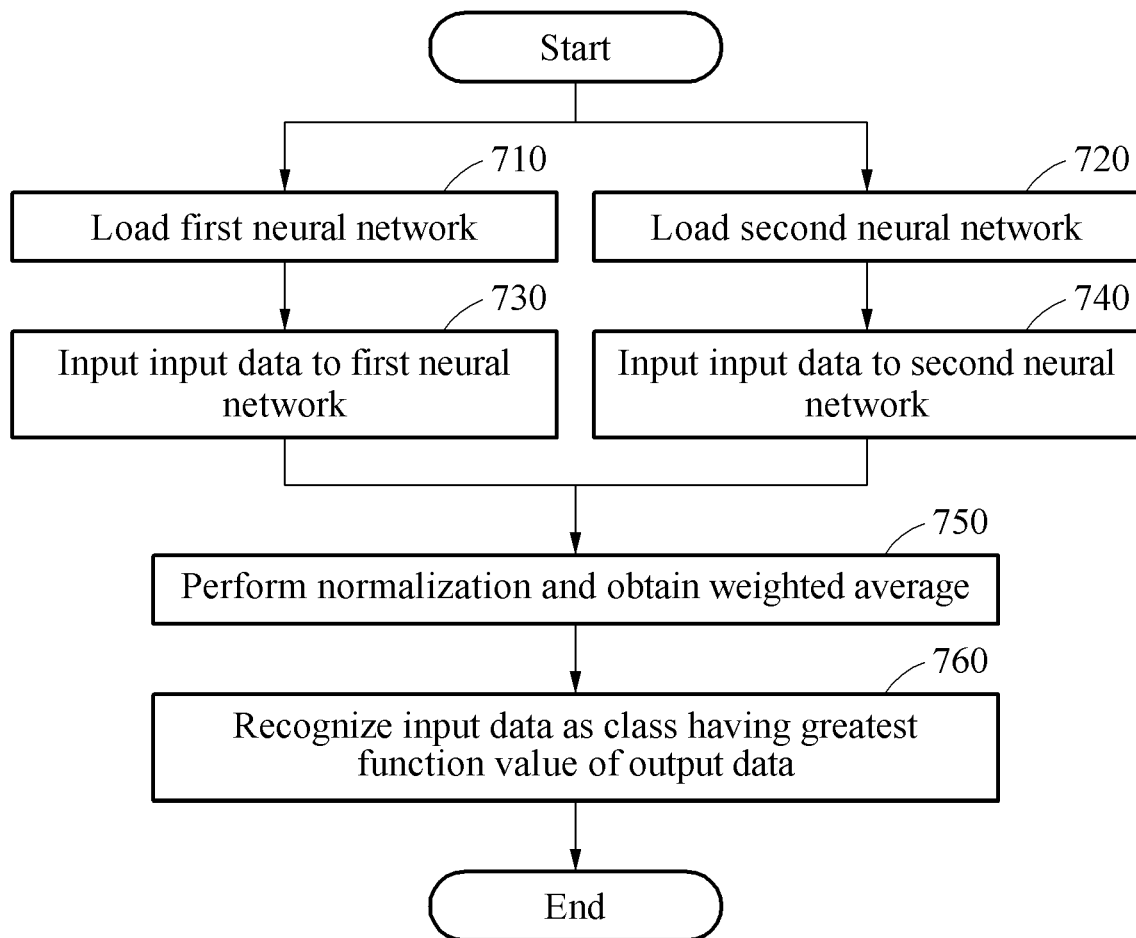
FIG. 7 illustrates an example multi-neural network, in accordance with one or more embodiments.

FIG. 7 illustrates an example multi-neural network recognition method, in accordance with one or more embodiments. Referring to FIG. 7, a recognition apparatus loads a first neural network in operation 710, loads a second neural network in operation 720, inputs input data to the first neural network in operation 730, and inputs the input data to the second neural network in operation 740. For example, the first neural network and the second neural network are trained using different loss functions. In operations 730 and 740, the recognition apparatus calculates network functions based on the input data and acquires function values the network functions as an output of the first neural network and an output of the second neural network. In operation 750, the recognition apparatus normalizes each of the output of the first neural network and the output of the second neural network based on a reference level and obtains a weighted average of the normalized output of the first neural network and the normalized output of the second neural network. Data corresponding to the weighted average is output as output data. The reference level corresponds to a conditional probability of input data of a first class being recognized as the first class. In operation 760, the recognition apparatus recognizes the input data as a class corresponding to the determined greatest function value among the output data. Though loading and inputting operations 710, 730 of FIG. 7 are discussed as being performed distinctly from loading and inputting operations 720, 740 of FIG. 7, it is noted that such operations may also be performed in parallel, e.g., as the same time.

Figure 8:
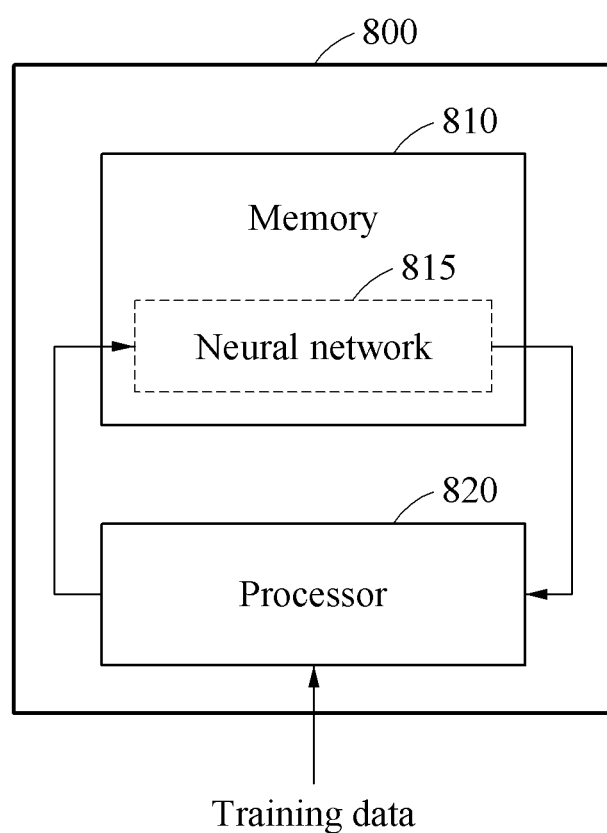
FIG. 8 illustrates an example training apparatus, in accordance with one or more embodiments.

FIG. 8 illustrates an example training apparatus, in accordance with one or more embodiments. Referring to FIG. 8, a training apparatus 800 includes a memory 810 and a processor 820. The processor 820 and the memory 810 may be respectively representative of one or more processors 820 and one or more memories 810. The memory 810 includes a neural network 815 and instructions to be read by the processor 820. When the instructions are executed in the processor 820, the processor 820 performs a training operation on the neural network 815. For example, when the instructions are executed in the processor 820, the processor 820 may configured, or may be controlled, to input training data to the neural network 815, determine a mapping function corresponding to a multiclass output of the neural network in association with the training data, acquire a loss function including a first probability component that changes correspondingly to a function value of the mapping function of a first class and a second probability component that changes contrastively to a function value of the mapping function of a second class, determine a gradient of loss corresponding to the training data based on the loss function, and update a parameter of the neural network based on the determined gradient of loss. Such training based on such a contrastive loss function may be performed with respect to each output or each class of the neural network. The training data is also referred to as, for example, input data. The memory 810 stores the neural network 815 on which the training is completed and stores data for the training operation such as the training data.

Figure 9:
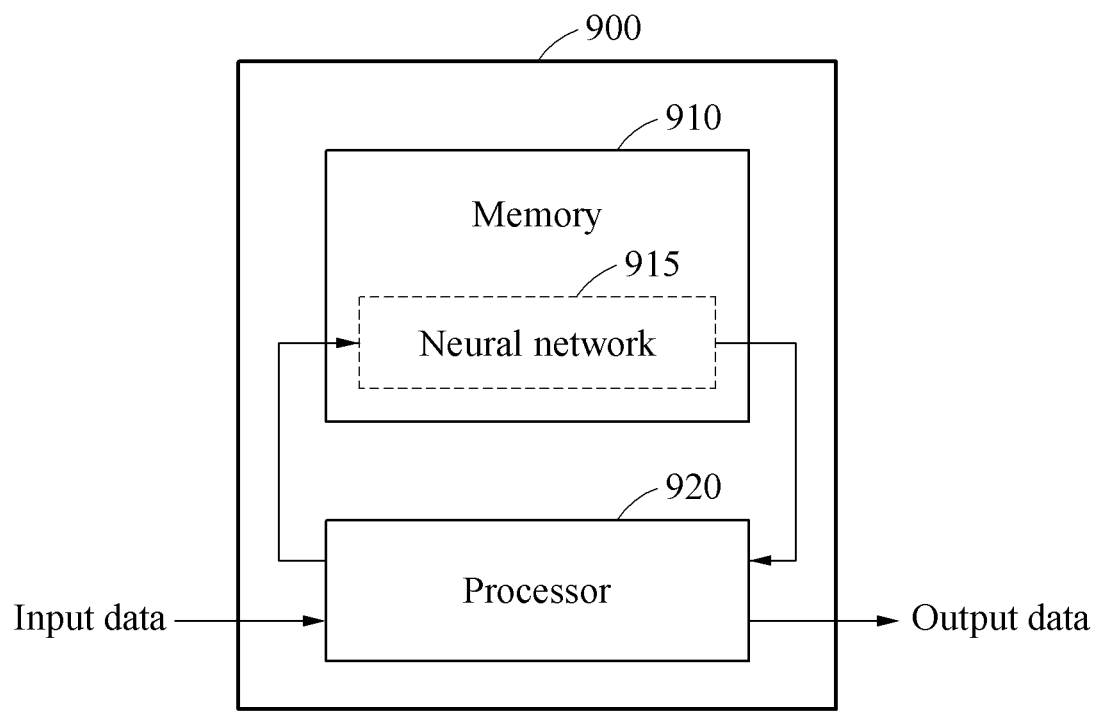
FIG. 9 illustrates an example recognition apparatus, in accordance with one or more embodiments.

FIG. 9 illustrates an example recognition apparatus, in accordance with one or more embodiments. Referring to FIG. 9, a recognition apparatus 900 includes a memory 910 and a processor 920. The processor 920 and the memory 910 may be respectively representative of one or more processors 920 and one or more memories 910. The memory 910 includes a neural network 915 and instructions to be read by the processor 920. For example, when the neural network 915 is read and the instructions are executed in the processor 920, the processor 920 performs a recognition operation using the neural network 915. The neural network 915 may correspond to any of the trained neural networks discussed herein, and there may be more than one neural network 915 stored in the memory 910 and similarly implementable. For example, when the instructions are executed in the processor 920, the processor 920 may configured, or may be controlled, to input input data to each of a first neural network trained using a first loss function and a second neural network trained using a second loss function, normalize each of an output of the first neural network and an output of the second neural network based on a reference level, obtain a weighted average of the normalized output of the first neural network and the normalized output of the second neural network, and indicate a result of the recognition based on the weighted average. The memory 910 stores the neural network 915 on which training is completed and stores data for the recognition operation.

Though examples of FIGS. 8 and 9, as well as FIG. 10 discussed below, may be discussed as computing hardware or processor(s) implementing instructions, or such computing hardware or processor(s) and one or memories that store such instructions, examples are not limited thereto. For example, such operations may also be implemented solely through computing hardware, e.g., without some or all such instructions. Regardless, references to such computing hardware being configured to perform such operations may refer to any such computing hardware or processor only implementations, computing hardware or processor implementations through execution of stored or otherwise available instructions, or computing hardware or processors in combination with stored or otherwise available instructions.

Figure 10:
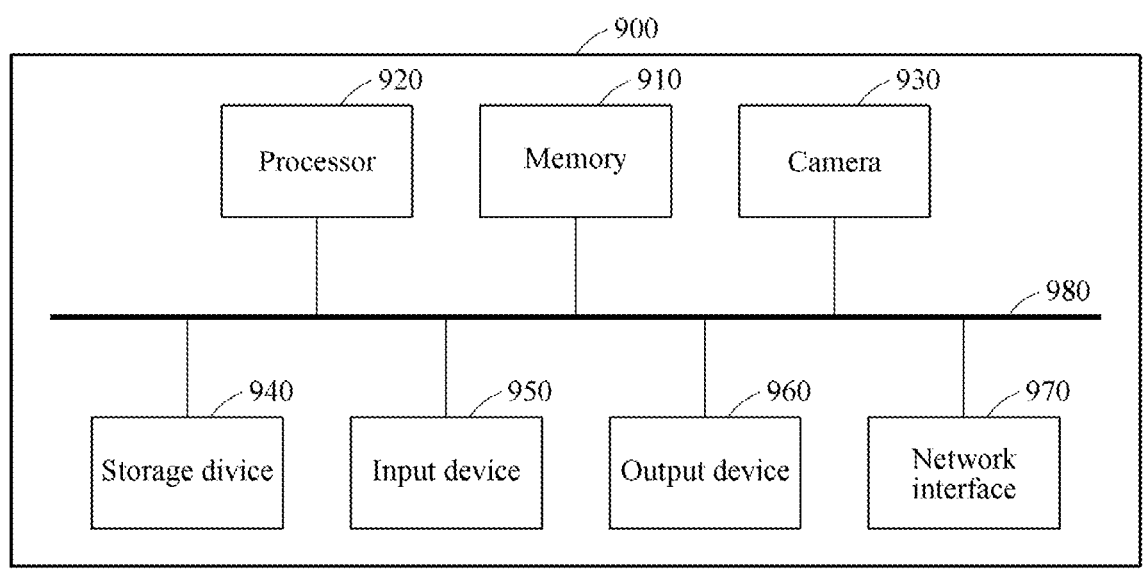
FIG. 10 illustrates an example computing apparatus, in accordance with one or more embodiments.

Thus, in examples, such as the computing apparatus 1000 of FIG. 10 or the recognition apparatus 900 of FIG. 9, each of which herein can individually and collectively be referred to as respective recognition or classification apparatuses, each apparatus includes one or more processors configured to perform recognition (or otherwise classification) based on one or more input data and to indicate a recognition (or classification) result. As suggested above, the recognition result may be indicated through explicit and/or inferential indications. For example, when the neural network 100 is configure to perform recognition or classification of input audio information to classify input data between different classes, e.g., different words or sounds, an explicit indication may be found with the recognition apparatus 900 displaying the resultant classified sound or word or audibly feeding back the recognition result to a user for confirmation of a command or query, while an inferential indication may include the recognition apparatus 900 implementing such a commend or results of such a query, or using the example classified sound recognition result in discerning a larger word recognition result. As another example, when the recognition apparatus 900 is performing recognition or verification of input image data of a captured face image, e.g., as verification as to whether the captured face image corresponds to a valid user of the recognition apparatus 900 or for identifying the user from among plural previously identified people, the recognition result may include information indicating that verification or recognition has succeeded, and when the face included in the captured face image does not correspond to the valid user or a known person, the recognition result may alternatively include information indicating that the verification or recognition has failed. Alternatively, such as where such recognition or identification is performed for a device unlocking, payment function, or automatically performed or performed in a background operation, e.g., without request or potential knowledge of user(s), a successful or failed recognition result may not be explicitly reported to the user, but the successful or failure indications may be made through inferential operations to control/institute additional operations (or non-operation of the same), or output results may be implicitly or explicitly indicated to another device or server that may receive or monitor results of the example recognition or identifications or results of recognitions or identifications from one or more other recognition apparatuses. Thus, the recognition result may also be indicated through, and used for, implementing or initiating of further processing of the recognition apparatus, such as further processing operations in which user verification may be beneficial or required. As only examples, when recognition of the recognition apparatus is successful, the recognition apparatus may unlock a user interface of the recognition apparatus as the indication of the success, such as when the recognition apparatus is a user terminal, e.g., a smart phone or tablet, and the unlocking enables the user to access additional information or perform additional functions of user terminal, or the recognition apparatus may control or indicate to an external device to permit entry of a user to a restricted area or zone due to the verification. For example, the recognition apparatus may be included or connected to a door entry system or may even be a door bell, or part of an automated door unlocking or locking system. In another example, through a successful verification or identification by the recognition apparatus, the recognition apparatus may authorize financial or payment transactions to proceed or be initiated, as well as alternative operations or processes depending on embodiment. Here, such speech recognition or face recognition operations are used as only examples of such explicit or implicit indications of the example recognition result of the implementations of the trained neural network, noting that alternative examples are available where the recognition apparatus 900 is configured to perform other recognitions or classifications of various respective input data and thus also perform such explicit or implicit indications of the results of the corresponding implemented trained neural network, respectively trained for varying corresponding objectives.

FIG. 10 illustrates an example computing apparatus, in accordance with one or more embodiments. Here, in an example, the computing apparatus 1000 of FIG. 10 may correspond to the recognition apparatus 900 of FIG. 9. Accordingly, the processor 920 and memory 910 of the recognition apparatus 900 will be similarly referred to with respect to the computing apparatus 1000, noting that examples are not limited thereto.

Referring to FIG. 10, a computing apparatus 1000 performs a recognition process by obtaining an image and performing recognition on the obtained image or extracted features of the obtained image. The computing apparatus 1000 may correspond to the recognition apparatus 900 illustrated in FIG. 9, and/or the training apparatus 800 of FIG. 8, as non-limiting examples, and thus the processor 920 of the computing apparatus 1000 may be configured or configurable to perform any one, any combination, or all operations described herein.

The computing apparatus 1000 includes a processor 920, a memory 910, a camera 930, a storage device 940, an input device 950, an output device 960, and a network interface 970. The processor 920, the memory 910, the camera 930, the storage device 940, the input device 950, the output device 960, and the network interface 970 may communicate with one another through a communication bus 980.

The camera 930 may capture a still image, a video image, or both, as an example of the capturing of data that may be input to the neural network stored in the memory 910 or storage device 940 and implemented by the processor 920. The processor 920 may control the camera 930 to obtain or capture an image, or may control the camera 930 to autonomously capture images and automatically perform recognition on the same, for example. In addition, as noted above, the camera 930 may also be controlled by the processor 920 during other functions of the computing apparatus 1000, such as when operated as a personal camera. The camera 930 may also be representative of plural cameras, such as a color image/video camera and a depth or infrared camera or time of flight (TOF) module, as only non-limiting examples.

The processor 920 may implement functions and instructions to operate in the computing apparatus 1000 as described herein. For example, the processor 920 may execute instructions stored in the memory 910 or the storage device 940. The processor 920 may be the same one or more processors as the processor 920 of FIG. 9. The processor 920 may be representative of one processor, as well as multiple processors, or other computing hardware. As noted above, the processor 920 is configured to perform one or more, any combination, or all operations described with reference to FIGS. 1 through 10. For example, the processor 920 may be configured to perform recognition or classification of input data of or derived from image(s) captured by the camera 930. In addition, the processor 920 is configured to control other functions of the computing apparatus 1000. For example, the computing apparatus 1000 may be mobile device, such as a mobile phone, tablet, or personal computer, and thus the processor 920 is further configured to implement other typical functions of the computing apparatus 1000. In an example, the processor 920 may be configured to implement a lock-out operation to only permit a user to access or implement such other typical functions upon a successful verification of the user's captured face image, as discussed above.

The memory 910 is a non-transitory computer readable media or device that stores information to be used for one or more recognition operations or objectives, which may include one or more different neural networks, for various trained objectives, that have been trained as discussed herein. The memory 910 may be the same memory as memory 910 of FIG. 9 and/or memory 810 of FIG. 8, though examples are not limited thereto. The memory 910 includes a computer-readable storage medium or a computer-readable storage device. In addition, memory 910 is further representative of multiple such types of memory. The memory 910 includes, for example, a RAM, a dynamic RAM (DRAM), a static RAM (SRAM), and other types of a nonvolatile memory well-known to the technical field to which the present disclosure pertains. The memory 910 may also store instructions to be implemented or executed by the processor 920, and store related information during software or an application being performed by the computing apparatus 1000.

The storage device 940 includes a computer-readable storage medium or a computer-readable storage device. In one example, the storage device 940 stores a greater quantity of information compared to the memory 910, and stores information for a long period of time. The storage device 940 includes, for example, a magnetic disk drive, an optical disc, a flash memory, an erasable programmable read-only memory (EPROM), a floppy disk, o other types of nonvolatile memories well-known in the technical field to which the present disclosure pertains.

The input device 950 receives input from the user through a tactile, video, audio, or touch input, or input of other information. The received input may also be considered by the processor 920 when implementing recognition, such as being provided to the trained neural network implemented by the processor 920. The input device 950 includes one or more of, for example, a keyboard, a mouse, a touchscreen, a microphone, and other devices configured to detect and/or capture the input from the user and transmit the detected input to the computing apparatus 1000.

The output device 960 provides the user with an output of the computing apparatus 1000 through a visual, auditory, or tactile channel. For example, the output device 960 may visualize information related to the verification result and provide the user with the visualized information. For example, the visualized information may indicate whether the recognition was successful or classification results, or may enable access to further functions of the computing apparatus 1000 demonstrated through the visualized information. The output device 960 includes one or more of, for example, a liquid crystal display (LCD), a light-emitting diode (LED) display, a touchscreen, a speaker, a vibration generator, and other devices configured to provide the output to the user.

The network interface 970 communicates with an external device through a wired and/or wireless network.

The recognition apparatuses, classification apparatuses, training apparatuses, training apparatus 800, processor 820, memory 810, recognition apparatus 900, processors 920, memories 910, computing apparatus 1000, camera 930, storage device 940, input device 950, output device 960, network interface 970, and bus 980, with respect to FIGS. 1-10, and that perform operations described in this application are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented training method comprising:
  inputting input data to a neural network;
  determining respective mapping functions corresponding to a multiclass output of the neural network in association with the input data, including determining a mapping function of a first class and a mapping function of a second class;
  acquiring a result of a loss function including a first probability component that changes correspondingly to a function value of the mapping function of the first class and a second probability component that changes contrastively to a function value of the mapping function of the second class;

determining a gradient of loss corresponding to the input data based on the result of the loss function; and updating a parameter of the neural network based on the determined gradient of loss for generating a trained neural network based on the updated parameter, wherein the function value of the mapping function of the first class is determined by inputting the input data to the mapping function of the first class, and wherein the function value of the mapping function of the second class is determined by inputting the input data to the mapping function of the second class.

2. The method of claim 1, wherein the first probability component increases with respect to increases in the function value of the mapping function of the first class and the second probability component decreases with respect to increases in the function value of the mapping function of the second class.

3. The method of claim 1, wherein the first probability component is based on a probability function associated with the mapping function of the first class and the second probability component is based on an inverse probability function associated with the mapping function of the second class.

4. The method of claim 1, wherein, in response to the parameter of the neural network being updated iteratively, a monotonically increasing relationship is established between the mapping function of the first class and a conditional probability of input data of the first class being recognized as the first class.

5. The method of claim 1, wherein the loss function corresponds to an equation as follows:

$$L_{2a} = -\sum_{i=1}^{c} \sum \left( \log \sigma(f_i(x)) + \sum_{\substack{j=1 \\ j \neq i}}^{c} \log (1 - \sigma(f_j(x))) \right),$$

where $L_{2a}$ denotes the loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

6. The method of claim 5, further comprising:

acquiring another loss function, wherein the other loss function corresponds to another equation as follows:

$$L_1 = -\sum_{i=1}^{c} \sum \log \frac{e^{f_i(x)}}{\sum_{j=1}^{c} e^{f_j(x)}};$$

determining another gradient of loss corresponding to the input data based on the other loss function; and updating another parameter of the neural network based on the determined other gradient of loss.

7. The method of claim 1, wherein the loss function corresponds to an equation as follows:

$$L_{2b} = -\sum_{i=1}^{c} \sum \left( \log \sigma(f_i(x)) + \sum_{j=1}^{c} \log (1 - \sigma(f_j(x))) \right),$$

where $L_{2b}$ denotes the loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

8. The method of claim 7, further comprising:

acquiring another loss function, wherein the other loss function corresponds to another equation as follows:

$$L_1 = -\sum_{i=1}^{c} \sum \log \frac{e^{f_i(x)}}{\sum_{j=1}^{c} e^{f_j(x)}};$$

determining another gradient of loss corresponding to the input data based on the other loss function; and updating another parameter of the neural network based on the determined other gradient of loss.

9. The method of claim 1, wherein the loss function corresponds a contrastive loss function, and the method further comprises determining another gradient of loss corresponding to the input data based on a cross-entropy loss function, and updating another parameter of the neural network based on the determined other gradient of loss for the generating of the trained neural network.

10. The method of claim 1, wherein the updating comprises adjusting the parameter of the neural network in a direction opposite to a direction of the determined gradient of loss.

11. A non-transitory computer-readable storage medium storing instructions that, when executed by a processor, cause the processor to perform the method of claim 1.

12. A processor implemented recognition method comprising:

inputting input data respectively to each of a first neural network portion of a neural network trained using a first loss function and a second neural network portion of the neural network trained using a second loss function;

respectively normalizing each of an output of the first neural network portion and an output of the second neural network portion based on a reference level;

obtaining a weighted average of the normalized output of the first neural network portion and the normalized output of the second neural network portion; and indicating a recognition result of the neural network based on the obtained weighted average.

13. The method of claim 12, wherein the reference level corresponds to a conditional probability of data of a first class being recognized by the neural network as the first class.

14. The method of claim 12, wherein the first loss function, as a contrastive loss function, includes a first probability component that changes correspondingly to a function value of a mapping function of a first class and a second probability component that changes contrastively to a function value of a mapping function of a second class.

15. The method of claim 14, wherein the second loss function corresponds to a cross-entropy loss function.

16. The method of claim 12, wherein the first loss function corresponds to an equation as follows:

$$L_{2a} = -\sum_{i=1}^{c} \frac{x}{x \in X_i} \left( \log \sigma(f_i(x)) + \sum_{\substack{j=1 \\ j \neq i}}^{c} \log (1 - \sigma(f_j(x))) \right),$$

where $L_{2a}$ denotes the first loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

17. The method of claim 16, wherein the second loss function corresponds to an equation as follows:

$$L_{2b} = -\sum_{i=1}^{c} \frac{x}{x \in X_i} \left( \log \sigma(f_i(x)) + \sum_{j=1}^{c} \log (1 - \sigma(f_j(x))) \right).$$

18. The method of claim 16, wherein the normalizing comprises normalizing the output of the first neural network using an equation as follows:

$\sigma(f_i(x))$.

19. The method of claim 12, wherein the first loss function corresponds to an equation as follows:

$$L_{2b} = -\sum_{i=1}^{c} \frac{x}{x \in X_i} \left( \log \sigma(f_i(x)) + \sum_{j=1}^{c} \log (1 - \sigma(f_j(x))) \right),$$

where $L_{2b}$ denotes the first loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

20. The method of claim 19, wherein the normalizing comprises normalizing the output of the first neural network portion using an equation as follows:

$e^{f_i(x)}$.

21. A neural network apparatus comprising:
one or more processors configured to:
  input input data to a neural network;
  determine respective mapping functions corresponding to a multiclass output of the neural network in association with the input data, including determining a mapping function of a first class and a mapping function of a second class;
  acquire a result of a loss function including a first probability component that changes correspondingly to a function value of the mapping function of the first class and a second probability component that changes contrastively to a function value of the mapping function of the second class;
  determine a gradient of loss corresponding to the input data based on the result of the loss function; and
  update a parameter of the neural network based on the determined gradient of loss for generating a trained neural network based on the updated parameter,
  wherein the function value of the mapping function of the first class is determined by inputting the input data to the mapping function of the first class, and wherein the function value of the mapping function of the second class is determined by inputting the input data to the mapping function of the second class.

22. The apparatus of claim 21, further comprising a memory including instructions,
  wherein, in response to the instructions being executed by the one or more processors, the one or more processors are controlled to perform the determining of the respective mapping functions, the acquiring of the result of the loss function, the determining of the gradient of loss, and the updating of the parameter of the neural network for the generating of the trained neural network based on the updated parameter.

23. The apparatus of claim 21, wherein the first probability component increases with respect to the function value of the mapping function of the first class and the second probability component decreases with respect to increases in the function value of the mapping function of the second class.

24. The apparatus of claim 21, wherein the first probability component is based on a probability function associated with the mapping function of the first class and the second probability component is based on an inverse probability function associated with the mapping function of the second class.

25. The apparatus of claim 21, wherein the loss function corresponds to an equation as follows:

$$L_{2a} = -\sum_{i=1}^{c} \frac{x}{x \in X_i} \left( \log \sigma(f_i(x)) + \sum_{\substack{j=1 \\ j \neq i}}^{c} \log (1 - \sigma(f_j(x))) \right),$$

where $L_{2a}$ denotes the loss function, i and j denote respective classes, c denotes a number of classes, x denotes input data, $X_i$ denotes input data of a class i, $\sigma$ denotes a sigmoid function, and $f_i(x)$ denotes a mapping function of the class i, and $f_j(x)$ denotes a mapping function of a class j.

26. The apparatus of claim 21, wherein the loss function corresponds to an equation as follows:

$$L_{2b} = -\sum_{i=1}^{c} \frac{x}{x \in X_i} \left( \log \sigma(f_i(x)) + \sum_{j=1}^{c} \log (1 - \sigma(f_j(x))) \right),$$

where $L_{2b}$ denotes the loss function, i and j denote respective classes, c denotes a number of classes, x denotes input data, $X_i$ denotes input data of a class i, $\sigma$ denotes a sigmoid function, $f_i(x)$ denotes a mapping function of the class i, and $f_j(x)$ denotes a mapping function of a class j.

27. The apparatus of claim 21, wherein the loss function corresponds a contrastive loss function, and the one or more processors are further configured to determine another gradient of loss corresponding to the input data based on a cross-entropy loss function, and update another parameter of the neural network based on the determined other gradient of loss for the generating of the trained neural network.

28. The apparatus of claim 21, wherein the input data is training data and the trained neural network is a first neural network portion of a recognition neural network, and the one or more processors are further configured, for performing recognition of non-training input data, to:

input the non-training input data to each of the first neural network portion trained using the loss function, and a second neural network portion trained using a different loss function;

normalize each of an output of the first neural network portion and an output of the second neural network portion based on a reference level;

obtain a weighted average of the normalized output of the first neural network portion and the normalized output of the second neural network portion; and indicate a recognition result of the recognition neural network based on the obtained weighted average.

29. An apparatus comprising:
one or more processors configured to execute instructions; and
a memory storing the instructions that, when executed by the one or more processors, configure the one or more processors to:
generate a trained neural network by iteratively training an in-training neural network using a contrastive loss based on:
a first probability component that changes correspondingly to a first classification result of the in-training neural network for a first class, of multiple classes classifiable by the in-training neural network, with respect to training data and the first class; and
a second probability component that changes contrastively to a second classification result of the in-training neural network for a second class, of multiple classes classifiable by the in-training neural network, and the second class.

30. The apparatus of claim 29, wherein, through the execution of the instructions, the one or more processors are further configured to:
generate another trained neural network by iteratively training another in-training neural network based on a cross-entropy loss with respect to a second training data or based on a different contrastive loss based on another first probability component, which changes correspondingly to another first classification generated by the other in-training neural network with respect to the second training data and a corresponding first class of the multiple classes, and another second probability component that changes contrastively to another second classification generated by the other in-training neural network with respect to the second training data and a corresponding second class of the multiple classes; and generate a multi-neural network comprising the trained neural network and the other trained neural network for an inference operation using the trained multi-neural network provided input information.

31. The apparatus of claim 30, wherein, through the execution of the instructions or other instructions, the one or more processors are further configured to:
perform the inference operation by implementing both the trained neural network and the other trained neural network with respect to the input information;
normalize, based on a reference level, respective results of the implemented trained neural network and the implemented other trained neural network; and
generate a recognition result of the multi-neural network based on the normalized respective results.

32. The apparatus of claim 29, wherein, through the execution of the instructions or other instructions, the one or more processors are further configured to perform an inference operation using the trained neural network provided input information, and output a recognition result of the inference operation.

33. An apparatus for use with a contrastive loss trained neural network or a different contrastive loss trained neural network, respectively having characteristics of having been trained using a loss based on a first probability component that changes correspondingly to a classification result for a first class of multiple class results of a corresponding neural network, and a second probability component that changes contrastively to a classification result for a second class of the multiple class results, the apparatus comprising:
a memory storing, as respective neural networks, at least two of the contrastive loss trained neural network, the different contrastive loss trained neural network, or a cross entropy loss trained neural network; and
one or more processors configured to:
perform an inference operation by implementing the respective neural networks with respect to input information; and
normalize, based on a reference level, respective results of the implemented respective neural networks and generate a result of the inference operation based on the normalized respective results.

34. The apparatus of claim 33, wherein the inference operation is one of object classification, object recognition, voice recognition, and image recognition.

35. The apparatus of claim 34, wherein the apparatus is a smartphone or tablet.

* * * * *